United States Patent [19]

Nakanishi

[11] Patent Number: 4,744,601
[45] Date of Patent: May 17, 1988

[54] HEADREST APPARATUS

[75] Inventor: Motoyasu Nakanishi, Fujishi, Japan

[73] Assignee: Kabushiki Kaisha Cubic Engineering, Shimizushi, Japan

[21] Appl. No.: 44,901

[22] Filed: Apr. 29, 1987

[51] Int. Cl.⁴ .............................................. A47C 7/38
[52] U.S. Cl. ...................................... 297/391; 5/441;
    297/216; 297/408; 297/DIG. 2; 297/DIG. 3
[58] Field of Search ......... 297/216, 391, 410, DIG. 3,
    297/DIG. 2; 5/441, 450, 451

[56] References Cited

U.S. PATENT DOCUMENTS

| | | | |
|---|---|---|---|
| 3,362,032 | 1/1968 | Summers | 5/450 |
| 3,548,420 | 12/1970 | Spence | 5/451 X |
| 3,680,912 | 8/1972 | Matsuura | 297/DIG. 3 X |
| 3,706,472 | 12/1972 | Mertens | 297/391 X |
| 4,456,642 | 6/1984 | Burgdörfer et al. | 5/449 X |
| 4,588,229 | 5/1986 | Jay | 5/450 X |

FOREIGN PATENT DOCUMENTS 3520803 12/1986 Fed. Rep. of Germany ...... 297/391
56-89213 7/1981 Japan .

Primary Examiner—Kenneth J. Dorner
Assistant Examiner—Peter R. Brown
Attorney, Agent, or Firm—Wenderoth, Lind & Ponack

[57] ABSTRACT

A headrest apparatus comprising at least one support member mounted on a seat, a high cushioning elastic base provided on said support member, a low cushioning elastic support wall provided on said elastic base, an empty room formed in front of said elastic support wall, a head resting part formed at the front side of this empty room and a gel material layer formed by filling said empty room with gel material, wherein a load to be applied to said head resting part is applied to said gel material layer.

22 Claims, 3 Drawing Sheets

HEADREST APPARATUS

BACKGROUND OF THE INVENTION

The present invention relates to the headrest apparatus for use in seats of automobiles, airplanes, etc.

This type of conventional apparatus has a head resting part which supports a head of a man and comprises an elastic layer such as, for example, a molded part made of foamed polyurethane inside which a supporting member such as the support member is embedded.

Such headrest apparatus as described above is disclosed, for example, in the Japanese Patent Gazette (laying-open) No. SHO. 56-89213.

In such headrest apparatus as described above, there is a problem that a repulsive force of the elastic layer deteriorates the shock absorbing effect of said elastic layer as a whole since, when a sudden and strong shock is added to the head as in case of rear end collision, the head sinks into the elastic layer once and is pushed out toward the front by the repulsive force of this elastic layer because the head of the man is received by the elastic layer.

SUMMARY OF THE INVENTION

An object of the present invention is to provide a headrest apparatus which absorbs a sudden shock the human head receives without causing strong repulsion.

In the apparatus in accordance with the present invention, a head resting part is filled with gel material, an elastic support wall with small cushion effect is formed behind said head resting part, and a base part with large cushion effect is arranged behind this elastic support wall and a shock is reduced and absorbed by the above triple construction.

In case of the apparatus in accordance with the present invention, a shock to be applied to the head is absorbed by non-elastic deformation of the gel material layer, dispersed by elastic deformation of the low cushioning elastic support wall and reduced by large and flexible elastic deformation of the high cushioning base part which supports the elastic support wall whereby the recovering repulsive force of said base part and the elastic support wall will reach the head while being absorbed by non-elastic deformation of the gel material layer and the repulsive elastic force received by the head can therefore be reduced.

DESCRIPTION OF THE PREFERRED EMBODIMENT

Figure 1:
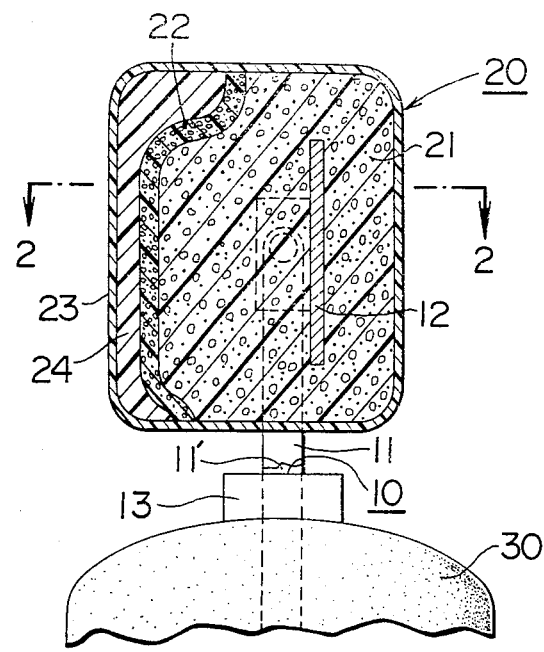
FIG. 1 is a vertical sectional side view of the headrest apparatus in accordance with the present invention.
Figure 2:
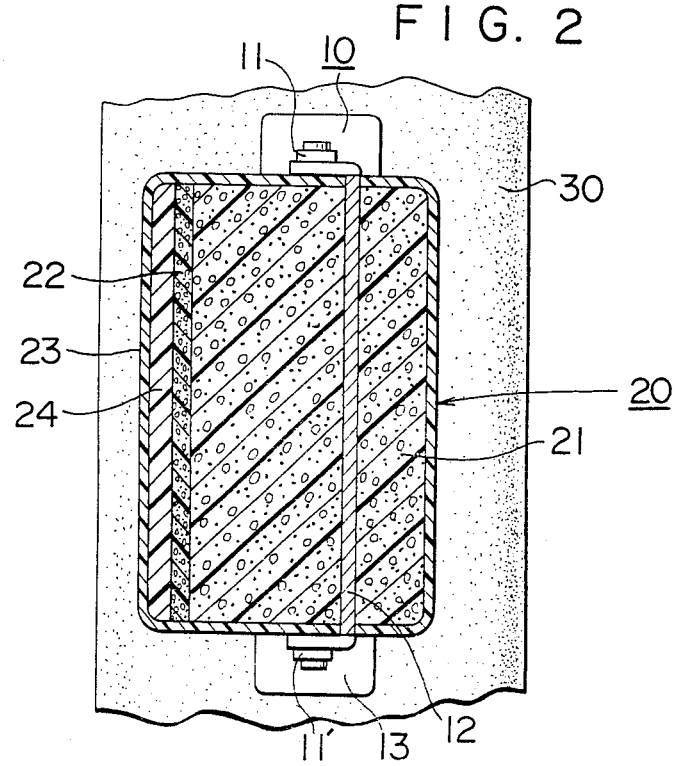
FIG. 2 is a cross sectional view of said apparatus along line 2—2.
Figure 3:
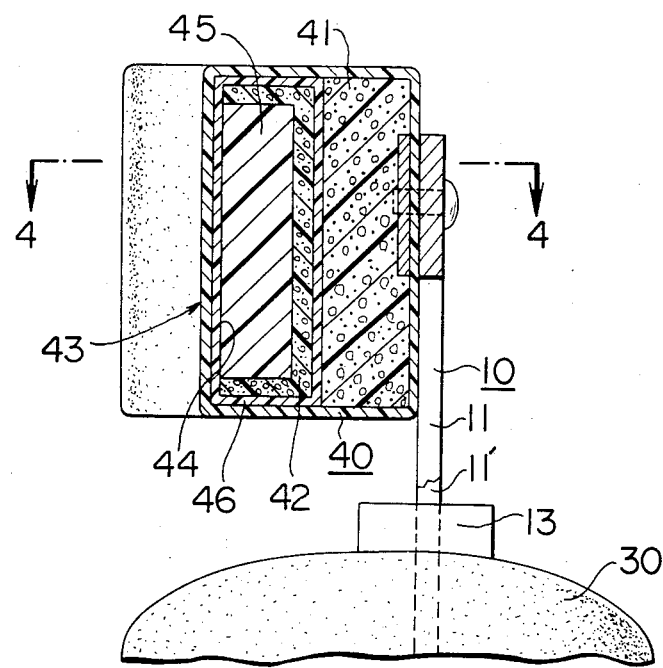
FIG. 3 is a vertical sectional side view showing another embodiment of the headrest apparatus in accordance with the present invention.

The headrest apparatus in accordance with the present invention has support mechanism 10 and pillow member 20 fitted to this support mechanism 10, which comprises a pair of support members 11 and 11' made of a hard material such as metal and pillow member securing part 12 provided between support members 11 and 11' which are fixed to seat 30 to be adjustable in its height.

Therefore, seat 30 is provided with base 13 and support members 11 and 11' are inserted into base 13 to be freely movable in the vertical direction and engaged and fixed at a desired height.

Said pillow member 20 can be provided, as required, to be pivotable between said support members 11 and 11' and thus inclined to an appropriate angle for the human head. In other words, the angle of said pillow member 20 to the support members 11 and 11' can be varied in accordance with the position of the human head.

Such construction as described above has been well known in conventional headrest apparatuses.

Said pillow member 20 comprises high cushioning elastic base part 21, which is made up so that said pillow member securing part 12 is sunk into it such as, for example, a block member made of foamed polyurethane or foamed polyethylene which is foamed by 60 times and molded, low cushioning elastic support wall 22 which is multi-layered at the front surface of said base part 21 such as, for example, a layer made of said foamed resin which is foamed by approximately 30 times and molded, head resting part 23 formed in front of said elastic support wall 22 by extending a soft cloth such as, for example, a sheet material made of polyurethane, and gel material layer 24 made up by filling an empty room formed between said elastic support wall 22 and said head resting part 23 with gel material.

Though the thickness of said elastic base part 21 can be determined as desired, it is generally approximately 30 to 50 mm and the thickness of said elastic support wall 22 is approximately 3 to 7 mm in case the thickness of elastic base part 21 is 30 to 50 mm.

On the other hand, the thickness of said gel material layer 24 is generally approximately 5mm but it can be 10 to 20mm depending on the case.

The thickness of every part can be freely determined and is not limited to the values shown above.

Though the sheet which forms head resting part 23 is adapted to integrally cover base part 21 in this embodiment, the external covering layer of head resting part 23 can be separated from base part 21.

The gel material which forms said gel material layer 24 is preferable to provide the penetration value of 50 to 200, particularly 100 to 200 and, if the penetration value is excessively small, the shock absorbing capacity will deteriorate and, if the penetration value is excessively large, a repulsive force applied to the head will be a problem.

The penetration value herein shown is measured according to JIS K 2530-1976 (50 g load) which is one of Japanese Industrial Standards.

This standard relates to the petroleum asphalt penetration testing method. The test has been conducted with a load of 100 g for a test sample with the penetration value of 350 or less but the load of 50 g has been used in the test for gelled material.

Since the apparatus in accordance with the present invention is as described above, the head of a man, when shocked by rear-end collision of the car, deforms low cushioning elastic support wall 22 while suddenly deforming gel material layer 24, and simultaneously sinks into base part 21 due to deformation of this elastic support wall 22. At this time, said gel material layer 24 deforms elastic support wall 22 while absorbing the shock energy from the human head by its non-elastic deformation and accordingly, the repulsive force due to repulsion at the instant of a shock applied to the human head can be small.

Shock energy due to deformation of elastic support wall 22 is transmitted to in a wide range since this elastic support wall 22 has a low cushioning effect and therefore shock energy is widely dispersed and transmitted to base part 21.

After base part 21 and elastic support wall 22 have been deformed by said shock energy and have absorbed the shock energy, the recovering repulsive force of base part 21 and elastic support wall 22 act as a repulsive force on the human head and push out the head frontwardly. In this case, the deformation of gel material layer 24 is non-elastic deformation and therefore a repulsive elastic force to the human head can be reduced.

Accordingly, an instantaneous force arising from an elastic force applied to the human head is effectively attenuated by deformation of gel material layer 24.

Figure 4:
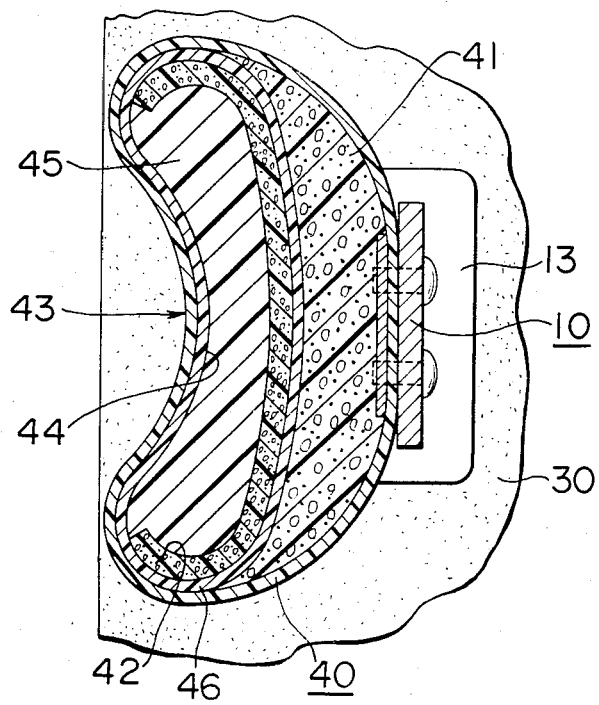
FIG. 4 is a cross sectional view of said apparatus along line 4—4.

Hereupon, the apparatus in accordance with the present invention can be made up by combining elastic base part 41 and elastic support wall 42 of pillow member 40 which are separately made and the empty room formed between said elastic support wall 42 and head resting part 43 can be formed in the shape of boat as shown in FIG. 4. In this case, after gel material layer 45 has been formed by filling the boat-shaped empty room with gel material, head receiving member 46 can be formed by sealing the empty room with elastic layer 44 such as, for example, foamed polyurethane sheet and fitted to base part 41.

If head receiving member 46 is separately made as described above, elastic layer 44 of head receiving member 46 can be made to form head resting part 43 but generally the front surface part of the external covering layer which integrally covers head receiving member 46 and base part 41 is used as head resting part 43.

In addition, said gel material layers 24 and 45 can preferably made up with silicone gel and Toray Silicone CY52 (trademark)(manufactured by Toray Silicone Kabushiki Kaisha) is suitable as such material.

If silicone is thus used as the material, the weight and price of silicone can be reduced by mixing fine hollow spherical particles such as fine particles of 5 to 300μ in diamater referred to as micro sphere, micro balloon, hollow bubble or synthetic foam in silicone.

A compound type silicone gel material mixed with fine hollow particles as described above is described in detail in the Specification of U.S. patent application Ser. No. 814,726.

Figure 5:
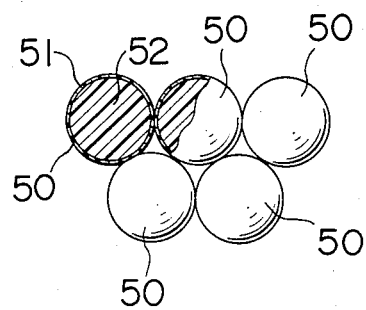
FIGS. 5 and 6 are respectively a partly cutaway perspective view illustrating an embodiment of gel material to be used in the gel material layer of the apparatus in accordance with the present invention.
Figure 6:
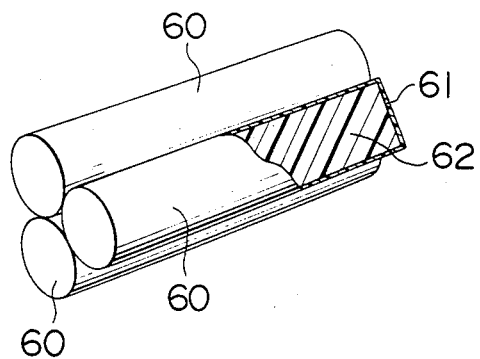

Said gel material layers 24 and 25 in said embodiment are formed, as a whole, as a single layer but these gel material layers can be formed with a plurality of block members such as, for example, gel material balls 50 as shown in FIG. 5 or cylindrical members 60 made of gel material as shown in FIG. 6. In this case, since the empty room between elastic support walls 22 and 24 and head resting parts 23 and 43 is filled with a plurality of balls 50 or cylindrical members 60, spaces among balls 50 or cylindrical members 60 act as air cushion.

For the block members such as balls 50 or cylindrical members 60, it is preferable to cover the internal gel material with external covering layer 51 or 61. A thin film made of elastic material such as silicone rubber can be used as this external covering layer 51 or 61 or a hardened film can be produced on the surface of silicone gel by chemical reaction.

Silicone gel on which the hardened film is formed is disclosed in the Japanese Patent Gazette No. SHO. 59-30932.

Said embodiments allow addition of a number of modifications without any deviation from the intent of the present invention and the present invention is not limited to said embodiments and allows various modifications.

What I claim is:

1. A headrest apparatus comprising
   a. a support mechanism provided with at least one support member which is uprightly fixed to a seat and a pillow member securing means, and
   b. a pillow member provided with a high cushioning elastic base part which is mounted on said support member, a low cushioning elastic support wall having a higher resistance to deformation than said elastic base part and which is provided in front of this elastic base part, an empty space formed in front of this elastic support wall, a head resting part formed on the front surface of this empty space, and a gel material layer which is formed by filling said empty room with gel material, wherein a load to be applied to said head resting part is applied to said gel material layer.

2. A headrest apparatus in accordance with claim 1, wherein said support member is fixed to said seat to be vertically shiftable.

3. A headrest apparatus in accordance with claim 1, wherein said pillow member is secured on the support mechanism with said pillow member securing means so that an angle of the head resting part of said pillow member to the support member can be varied.

4. A headrest apparatus in accordance with claim 1, wherein the penetration value of said gel material layer is 50 to 200.

5. A headrest apparatus in accordance with claim 1, wherein gel material which forms said gel material layer is silicone gel.

6. A headrest apparatus in accordance with claim 5, wherein said silicone gel contains a number of fine hollow particles.

7. A headrest apparatus in accordance with claim 6, wherein said fine hollow particles have diameter of 5 to 300μ, respectively.

8. A headrest apparatus in accordance with claim 1, wherein said head resting part is made of a part of sheet material which integrally covers said gel material layer and said elastic base part.

9. A headrest apparatus in accordance with claim 1, wherein said gel material layer is formed with block members sealed with gel material.

10. A headrest apparatus in accordance with claim 9, wherein said block members are balls which cover gel material with an external covering layer.

11. A headrest apparatus in accordance with claim 9, wherein said block members are cylindrical members which cover gel material with an external covering layer.

12. A headrest apparatus comprising
    a. a support mechanism provided with at least one support member which is uprightly fixed to a seat and a pillow member securing means,
    b. a high cushioning elastic base part which is fitted to said support member, c. a head receiving member which is coupled to the front part of said elastic base part, said head receiving member comprising
  (i) a low cushioning elastic support wall having a higher resistance to deformation than said elastic base part and located at said elastic base part side,
  (ii) an elastic layer which covers said elastic support wall and forms an empty space in front of said elastic support wall, and
  (iii) a gel material layer formed by filling said empty space with gel material, and
d. a head resting part formed at the front surface of said head receiving member, wherein a load applied to said head resting part is applied to said gel material layer through the elastic layer of said head receiving member.

13. A headrest apparatus in accordance with claim 12, wherein said support member is fixed to said seat to be vertically shiftable.

14. A headrest apparatus in accordance with claim 12, wherein said pillow member is secured on a support mechanism with said pillow member securing means so that the angle of the head resting part of said pillow member to the support member can be varied.

15. A headrest apparatus in accordance with claim 12, wherein the penetration value of said gel material layer is 50 to 200.

16. A headrest apparatus in accordance with claim 12, wherein the gel material which forms said gel material layer is silicone gel.

17. A headrest apparatus in accordance with claim 16, wherein said silicone gel contains a number of fine hollow particles.

18. A headrest apparatus in accordance with claim 17, wherein said fine hollow particles are particles having a diameter of 5 to 300μ.

19. A headrest apparatus in accordance with claim 12, wherein said head resting part is made of a part of sheet material which integrally covers said head receiving member and said elastic base part.

20. A headrest apparatus in accordance with claim 12, wherein said gel material layer is made of block members sealed with gel material.

21. A headrest apparatus in accordance with claim 20, wherein said block members are balls which cover gel material with an external covering layer.

22. A headrest apparatus in accordance with claim 20, wherein said block members are cylindrical members which cover gel material with an external covering layer.

* * * * *